United States Patent
Csabi et al.

(10) Patent No.: US 12,546,131 B1
(45) Date of Patent: Feb. 10, 2026

(54) TRANSACTION BOOTH

(71) Applicant: United Services Automobile Association (USAA), San Antonio, TX (US)

(72) Inventors: Rachel Elizabeth Csabi, Frisco, TX (US); Yan Pei, Frisco, TX (US); Yogen Rai, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1244 days.

(21) Appl. No.: 17/076,018

(22) Filed: Oct. 21, 2020

Related U.S. Application Data

(60) Provisional application No. 62/927,897, filed on Oct. 30, 2019.

(51) Int. Cl.
| | |
|---|---|
| *G06F 21/32* | (2013.01) |
| *E04H 1/12* | (2006.01) |
| *E05G 1/02* | (2006.01) |
| *G06F 21/64* | (2013.01) |

(52) U.S. Cl.
CPC ............... *E04H 1/125* (2013.01); *E05G 1/02* (2013.01); *G06F 21/32* (2013.01); *G06F 21/645* (2013.01)

(58) Field of Classification Search
None
See application file for complete search history.

(56) References Cited

U.S. PATENT DOCUMENTS

| | | | | |
|---|---|---|---|---|
| 4,911,087 | A * | 3/1990 | Couvrette | G07F 19/20 109/24.1 |
| 2002/0024590 | A1 * | 2/2002 | Pena | G06Q 20/4014 348/14.08 |
| 2007/0245158 | A1 * | 10/2007 | Giobbi | H04L 63/0861 713/186 |
| 2009/0027652 | A1 * | 1/2009 | Chang | H03K 17/943 250/214 AL |
| 2016/0012411 | A1 * | 1/2016 | Kursun | G07F 19/205 705/42 |
| 2016/0019510 | A1 * | 1/2016 | Guntupalli | G06Q 20/1085 705/43 |
| 2017/0344965 | A1 * | 11/2017 | Watson | G06Q 20/3224 |
| 2018/0033292 | A1 * | 2/2018 | Bhat | G08B 31/00 |

* cited by examiner

*Primary Examiner* — William J Jacob
(74) *Attorney, Agent, or Firm* — Fletcher Yoder, P.C.

(57) ABSTRACT

A transaction booth system includes a booth having a booth interior configured to receive a customer. The transaction booth system also includes a door system having a door that is configured to adjust between an open position to open the booth interior and a closed position to enclose the booth interior. The transaction booth system also includes an entry authentication system configured to authenticate the customer outside of the booth interior and an interior authentication system configured to authenticate the customer within the booth interior. The transaction booth system further includes a computer system that is configured to control the door of the door system to move to the open position in response to the entry authentication system signaling a confirmed primary authentication and to process one or more financial transactions in response to the interior authentication system signaling a confirmed secondary authentication and based on input from the customer.

10 Claims, 4 Drawing Sheets

TRANSACTION BOOTH

CROSS-REFERENCE TO RELATED APPLICATION

This application claims priority to and the benefit of U.S. Provisional Application No. 62/927,897, entitled "TRANSACTION BOOTH," filed Oct. 30, 2019, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Financial institutions generally have limited operating hours, which are usually during the week and during normal business hours. In order to complete certain types of transactions, customers have to physically visit the financial institution during the limited operating hours. However, the limited operating hours may not be sufficient to serve all customers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a transaction booth system includes a booth having a booth interior configured to receive a customer. The transaction booth system also includes a door system having a door that is configured to adjust between an open position to open the booth interior and a closed position to enclose the booth interior. The transaction booth system also includes an entry authentication system configured to authenticate the customer outside of the booth interior and an interior authentication system configured to authenticate the customer within the booth interior. The transaction booth system further includes a computer system communicatively coupled to the entry authentication system and the interior authentication system. The computer system is configured to control the door of the door system to move to the open position in response to the entry authentication system signaling a confirmed primary authentication and to move to the closed position after detecting the customer within the booth interior. The computer system is also configured to process one or more financial transactions in response to the interior authentication system signaling a confirmed secondary authentication and based on input from the customer.

In one embodiment, a transaction booth system includes a booth comprising a booth interior configured to receive a customer. The transaction booth system also includes an interior authentication system configured to authenticate the customer within the booth interior. The transaction booth system further includes a computer system communicatively coupled to the interior authentication system. The computer system is configured to control a door to move from an open position to a closed position to enclose the customer within the booth interior in response to detection of the customer within the booth interior. The computer system is also configured to provide access to a first type of financial transaction in response to the interior authentication system signaling a first level of interior authentication and based on input from the customer, and to provide access to a second type of financial transaction in response to the interior authentication system signaling a second level of interior authentication and based on the input from the customer.

In one embodiment, a method of operating a transaction booth includes receiving, at one or more processors, a confirmed primary authentication from an entry authentication system that is configured to authenticate a customer outside of a transaction booth. The method also includes instructing, at the one or more processors, a door of a door system to move to an open position to enable the customer to enter a booth interior of the transaction booth in response to receipt of the confirmed primary authentication from the entry authentication system. The method further includes receiving, at the one or more processors, a confirmed secondary authentication from an interior authentication system that is configured to authenticate the customer inside of the transaction booth. The method further includes enabling, using the one or more processors, one or more financial transactions in response to receipt of the confirmed secondary authentication from the interior authentication system in conjunction with a confirmation of the door being in a closed position.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present application relates generally to a transaction booth system (e.g., financial transaction booth system). The transaction booth system may facilitate various types of financial transactions, such as financial transactions that would otherwise be carried out in-person (e.g., by a customer interacting face-to-face with an employee of a financial institution). Because the transaction booth system enables the various types of financial transactions to be carried out without in-person interactions (e.g., without the employee of the financial institution present), the transaction booth system may enable the various types of financial transactions to be carried out at a wide range of times (e.g., outside of typical operating hours of the financial institution; outside of business hours; all day and night). The transaction booth system may also enable the various types of financial transactions to be carried out at multiple different locations, instead of only at a building of the financial institution. The transaction booth system may enable lockbox retrieval, lockbox storage, notary services, deposits, cash withdrawals, foreign currency exchanges, among others.

Figure 1:
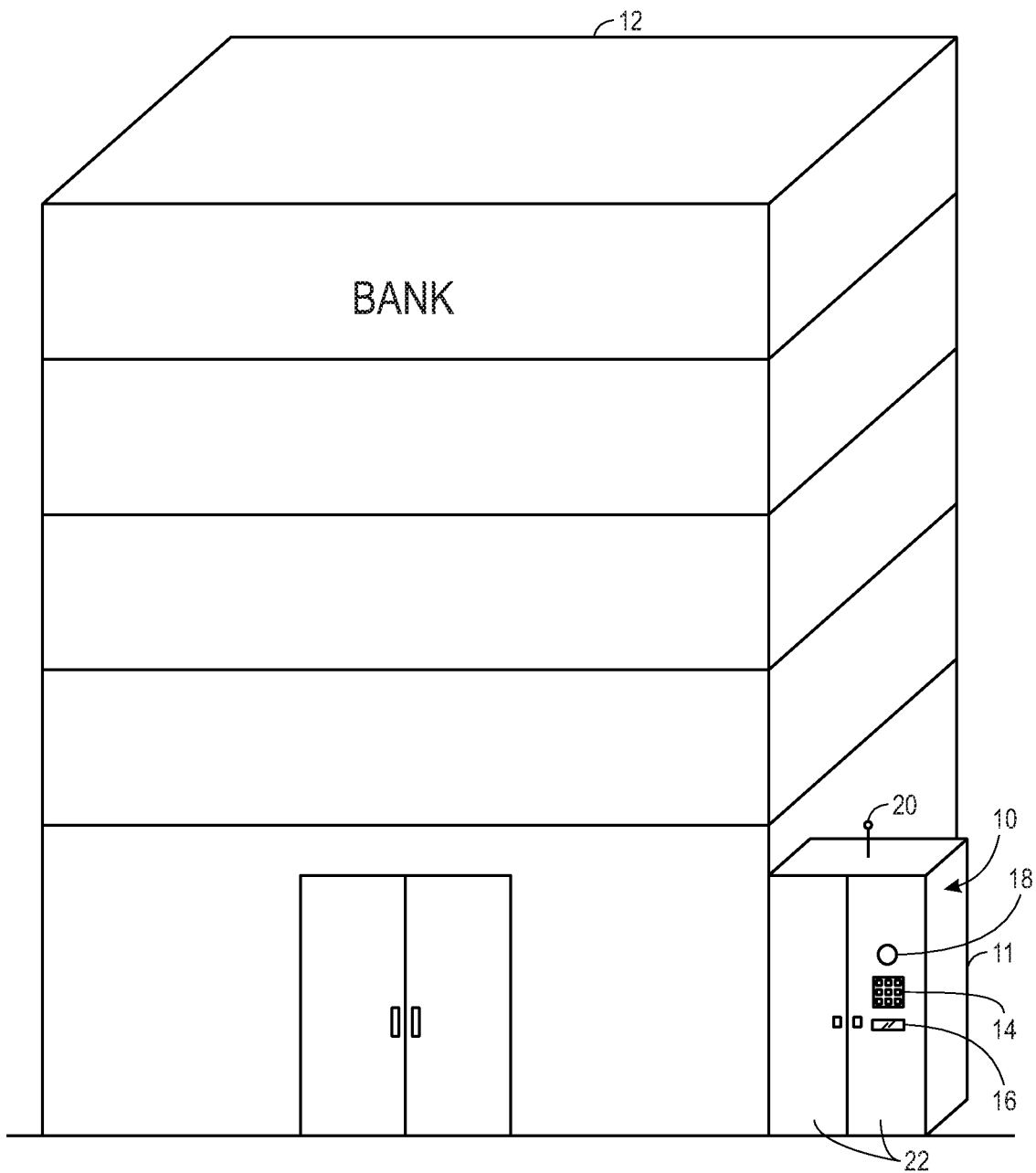
FIG. 1 is a schematic view of a transaction booth located at a financial institution, in accordance with embodiments described herein.

FIG. 1 is a schematic view of a transaction booth system 10 co-located with a financial institution 12 (e.g., a building of the financial institution 12). As illustrated, the transaction booth system 10 includes a transaction booth 11 (e.g., kiosk; enclosure) that may be physically coupled to the financial institution 12. Placement of the transaction booth system 10 at or proximate to the financial institution 12 may enable the transaction booth system 10 to benefit from the security of the financial institution 12, as well as provide a known location for customers. Co-locating the transaction booth system 10 with the financial institution 12 may also facilitate access to various services, such as lockbox services (e.g., access to a lockbox within the financial institution 12), via the transaction booth system 10.

The transaction booth 11 provides (e.g., encloses) a volume sufficient to accommodate a customer and may be freely accessible, such as 24 hours a day. The transaction booth system 10 may be accessible with and/or without authentication. In some embodiments, the transaction booth system 10 may be accessed by the customer only after authentication (e.g., using an entry authentication system). For example, the customer may receive or set an access code (e.g., unique access code; personal identification number [PIN]) during a registration process for the transaction booth system 10, and then the customer may enter the access code via a keypad 14 of the transaction booth system 10 in order to gain access to the transaction booth system 10. As another example, the customer may request an access code (e.g., via an application on a mobile device carried by the customer; via the keypad 14) and/or the customer may receive the access code (e.g., via the application on the mobile device) if the customer would like to access the transaction booth system 10. In such cases, the customer may then enter the access code via the keypad 14 in order to gain access to the transaction booth system 10.

In some embodiments, the transaction booth system 10 may be accessed using biometric authentication, such as fingerprint(s), retinal image, and/or facial recognition. For example, the transaction booth system 10 may include a touch pad 16 for scanning fingerprints and/or a camera 18 (e.g., imaging sensor) capable of capturing retinal images and/or faces. In some embodiments, the transaction booth system 10 may be accessed using a physical instrument, such as a mobile device (e.g., mobile phone), a key fob, a key card, a driver's license, and/or other identification card (e.g., passport, military identification card), that is encoded with information that is associated with the customer. For example, the financial institution may provide the customer a key fob and/or a key card (e.g., bankcard) that is encoded with the information and that enables access to the transaction booth system 10. In some embodiments, the transaction booth system 10 may include a transceiver 20 (e.g., transmitter, receiver, or both) that operates to detect the physical instrument, such as the mobile device (e.g., via wireless communication with the mobile device) or a radiofrequency identification (RFID) chip supported in the key fob or the key card. In response to completion of the authentication process, the transaction booth system 10 may automatically unlock an access point 22 (e.g., door system having door(s)). It should be appreciated that the transaction booth system 10 may be accessed using a combination of access codes, biometric authentication, and/or a physical instrument. For example, upon detection of the physical instrument at the transaction booth system 10, the customer may be prompted to carry out the biometric authentication process to unlock the access point 22.

In some embodiments, the transaction booth system 10 may provide a level of functionality that corresponds to a level of authentication. For example, upon a first level of authentication (e.g., entry of a key card and a PIN), the transaction booth system 10 may enable any person to use an automatic teller machine (ATM) at the transaction booth 11 to receive cash, check account balances, or the like (e.g., default functions of the transaction booth system 10). However, upon a second level of authentication (e.g., entry of the key card, a PIN, and/or an additional identifier, such as a biometric identifier) the transaction booth system 10 may enable a customer to access additional functions of the transaction booth system 10. For example, the second level of authentication may enable the customer to retrieve a lockbox, deposit a lockbox for storage, use notary services, exchange foreign currency, or the like.

As discussed in more detail below, in addition to the entry authentication system that is located outside of the transaction booth 11 and that provides a primary authentication of the customer to permit entry into the transaction booth 11, the transaction booth system 10 may include an interior authentication system that is located within the transaction booth 11 (e.g., accessible only after entry to the transaction booth 11) and that provides a secondary authentication of the customer to permit completion of the financial services and/or transactions. Although positioned at different locations about the transaction booth system 10, the entry authentication system and the interior authentication system may include the same or similar types of authentication components, such as biometric authentication devices, that facilitate authentication of the customer.

Figure 2:
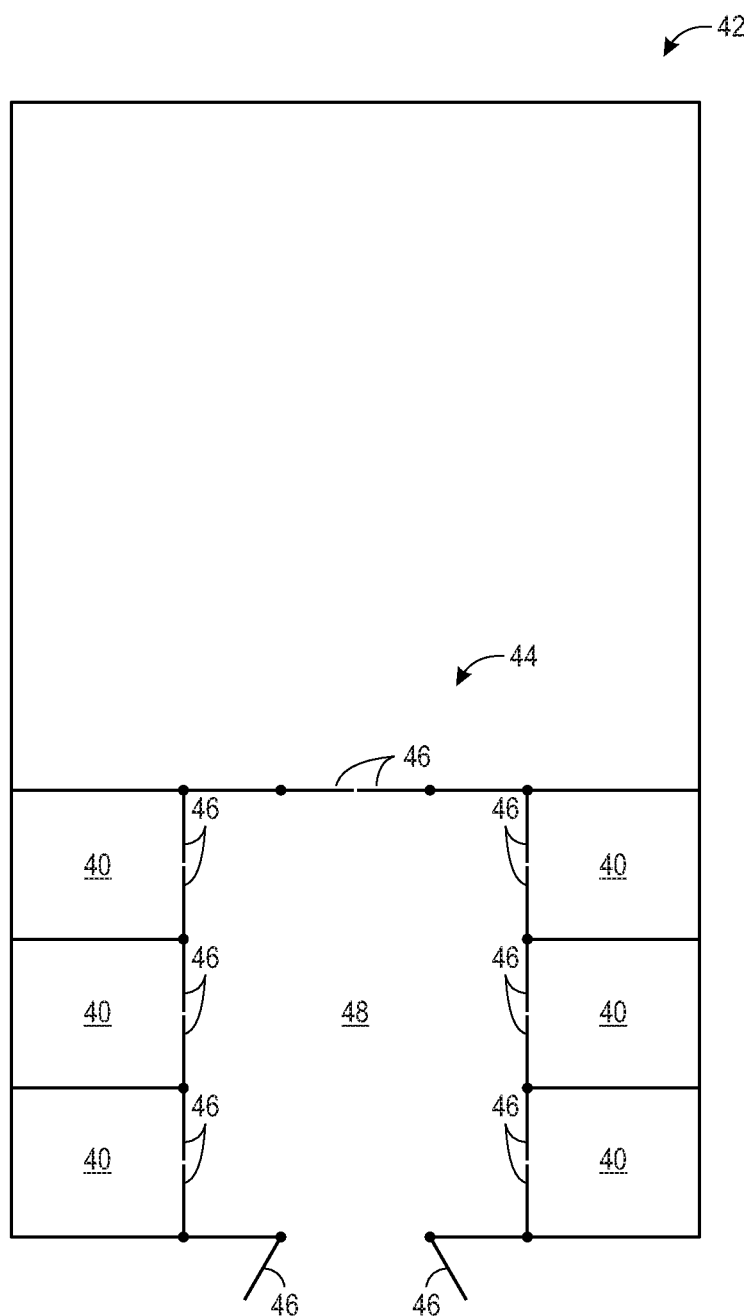
FIG. 2 is a schematic view of multiple transaction booths inside a building, in accordance with embodiments described herein.

FIG. 2 is a schematic view of multiple transaction booths 40 inside a building 42 (e.g., financial institution, shopping center, office building). The transaction booths 40 may form part of a transaction booth system 44 that provides a suite of services to customers. Each transaction booth 40 may include some or all of the features of the transaction booth 11 of FIG. 1, and the transaction booth system 44 may include some or all of the features of the transaction booth system 10 of FIG. 1.

In some embodiments, the multiple transaction booths 40 may be accessed via an access point 46 (e.g., door(s)) and may surround a common interior space 48 (e.g., volume). In such cases, the transaction booth system 44 may enable access to the multiple transaction booths 40 (e.g., by opening the access point 46) following authentication of the customer. It should be appreciated that other arrangements are envisioned, such as an arrangement in which each transaction booth 40 has its own access point 46 (e.g., instead of or in addition to the access point 46 to the common interior space 48).

In some embodiments, each transaction booth 40 may provide one or more specific types of financial services and/or transactions (e.g., deposit, cash withdrawal, currency conversion, notary services, and/or lockbox retrieval/deposit). For example, a first transaction booth 40 may provide a first type of financial service and/or transaction, and a second transaction booth 40 may provide a second type of financial service and/or transaction. As noted above, the customer may access some or all of the multiple transaction booths 40 via authentication that results in opening the access point 46 to the common interior space 48. Additionally or alternatively, the customer may access the first transaction booth 40 following a first type of authentication, and the customer may access the second transaction booth 40 following a second type of authentication. The level of the financial service and/or transaction may correspond to the level of authentication. For example, the first transaction booth 40 that provides the first type of financial service and/or transaction (e.g., cash deposit) may be accessed via a first level of authentication (e.g., a key card and a PIN), while the second transaction booth that provides the second type of financial service and/or transaction (e.g., lockbox retrieval) may be accessed via a second level of authentication (e.g., a key card, a PIN, and biometric identifier). Furthermore, in some embodiments, each transaction booth 40 may be capable of providing the same type(s) of financial services and/or transactions. However, a number and/or type(s) of financial services and/or transactions made available to the customer by the transaction booth 40 may depend on the level of authentication for the customer.

Figure 3:
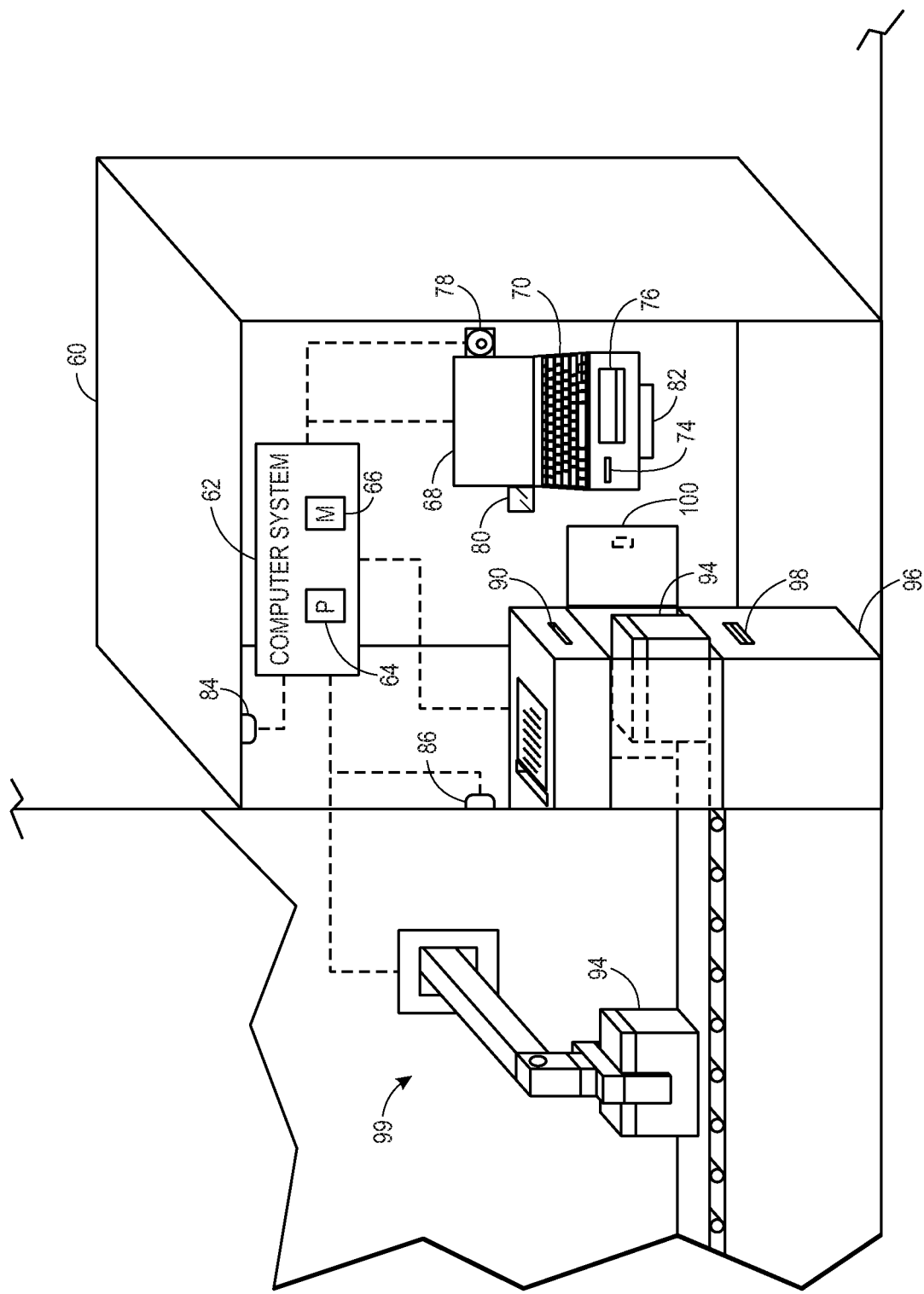
FIG. 3 is a schematic view of an interior of a transaction booth, in accordance with embodiments described herein.

FIG. 3 is a schematic view of an interior of a transaction booth 60. It should be appreciated that the transaction booth 11 of FIG. 1 and/or the transaction booth 40 of FIG. 2 may include some of all of the features of the transaction booth 60. The transaction booth 60 may provide one or more types of financial services and/or transactions, such as lockbox retrieval, lockbox storage, notary services, deposits, cash withdrawals, foreign currency exchanges, among others. The transaction booth 60 may include a computer system 62 that controls access to the transaction booth 60 (e.g., via the access point(s)) and/or that manages the financial services and/or transactions performed in the transaction booth 60. As shown, the computer system 62 may include one or more processors 64 (e.g., microprocessor) and one or more memory devices 66. The computer system 62 may also include one or more storage devices and/or other suitable components. The processor 64 may be used to execute software to carry out the processes disclosed herein, such as to control lock(s) at the access point(s) for access to the transaction booth 60 and/or to control other components within the transaction booth 60. The processor 64 may include multiple microprocessors, one or more "general-purpose" microprocessors, one or more special-purpose microprocessors, and/or one or more application specific integrated circuits (ASICS), or some combination thereof. For example, the processor 64 may include one or more reduced instruction set computer (RISC) processors. It should be appreciated that the computer system 62 may be a distributed computer system that includes multiple controllers having multiple processors and associated components, and not all processors and associated components need be physically located at the transaction booth 60.

The memory device 66 may include a volatile memory, such as random access memory (RAM), and/or a nonvolatile memory, such as read-only memory (ROM). The memory device 66 may store a variety of information and may be used for various purposes. For example, the memory device 66 may store processor executable instructions (e.g., firmware or software) for the processor 64 to execute. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

The computer system 62 may include or be coupled to a monitor or display 68. The display 68 may provide the customer with information, such as a variety of transaction options and/or feedback during the transactions (e.g., prompts to facilitate the transactions). The computer system 62 may receive input through an input device 70 (e.g., keyboard, keypad). In response to the input from the input device 70, the computer system 62 may change the information on the display 68, as well as operation of other components associated with the transaction booth 60. It should be appreciated that the display 68 may be a touchscreen display that is configured to operate as an input device (e.g., the display 68 may be the input device 70 or may be an additional input device in addition to the input device 70).

As noted above, the customer may gain access to the interior of the transaction booth 60 via the entry authentication system. In some embodiments, the customer may be provided with access to financial services and/or the ability to complete transactions within the transaction booth 60 in response to the entry authentication system authenticating the customer (e.g., primary authentication). However, in some embodiments, the transaction booth 60 includes the interior authentication system, which may be accessed only from the interior of the transaction booth 60 and which may include any of the authentication features disclosed herein, such as biometric authentication devices. In some embodiments, the customer may be provided with access to financial services and/or the ability to complete transactions within the transaction booth 60 only after the interior authentication system authenticates the customer (e.g., secondary authentication).

One of the transactions that the customer may perform in the transaction booth 60 includes the ability to access financial account(s) information. For example, the customer may insert a key card into the card reader 74 to enable authentication and retrieval of the financial account(s) information. The transaction booth 60 may dispense cash through a cash dispenser 76. As explained above, a level of access (e.g., to information and/or services) may correspond to a level of authentication. Accordingly, the transaction booth 60 may include a camera 78 (e.g., imaging sensor) for facial recognition and/or retinal image recognition. The transaction booth 60 may include a scanner 80 (e.g., fingerprint scanner that enables authentication through fingerprints). For example, a first level of authentication (e.g., a keycard and PIN) may enable access to some information for some financial accounts (e.g., a first daily maximum withdrawal limit for a checking account, but not a total account balance of the checking account) and/or cash withdrawal up to the first daily maximum withdrawal limit, while a second level of authentication (e.g., the keycard, PIN, and biometric identifier) may enable access to additional information for additional financial accounts (e.g., a total account balance of the checking account) and cash withdrawal (e.g., up to a second daily maximum withdrawal limit that is greater than the first daily maximum withdrawal limit). Furthermore, a third level of authentication (e.g., the keycard, PIN, and two types of biometric identifiers) may enable access to additional information for all financial accounts (e.g., a total account balance of all financial accounts, such as a checking account and a savings account), cash withdrawal (e.g., up to the second daily maximum withdrawal limit), notary services, and/or lockbox retrieval. Thus, the amount of money available for cash withdrawal may also vary based on the level of authentication (e.g., the amount of money may increase with the level of authentication). In some embodiments, the financial institution may set the level of authentication for each level of access (e.g., based on desired security and/or value of the transaction). In some embodiments, the customer may set the level of authentication for each level of access (e.g., provide customer preferences, such as during the registration process).

The transaction booth 60 may be secured such that it blocks access to its interior without authentication and it may include surveillance features (e.g., cameras with facial recognition) that facilitate controlled access or that buttress security measures. Upon entry (e.g., via the access point(s)), further authentication (and layered authentication) may be utilized for different types of services. The transaction booth 60 may also include monitoring features (e.g., facial recognition sensors, motion detectors, and/or pulse monitors that detect the presence of one or more individuals) that form an interior detection system. Some or all of the monitoring features may also be used for authentication (e.g., be part of both the interior detection system and the interior authentication system). The computer system 62 may control the access point(s) to close upon receipt of signals from the monitoring features that indicate the presence of one or more persons inside the transaction booth 60. However, in some embodiments, the computer system 62 may only control the access point(s) to close upon receipt of signals from the monitoring features that indicate the presence of only one person inside the transaction booth 60 (e.g., confirm that the customer is inside the transaction booth 60, such as facial recognition that confirms that the customer is inside the transaction booth 60). In some embodiments, the computer system 62 may hold the access point(s) open and/or block certain services upon receipt of signals from the monitoring features that indicate that more than one person is inside the transaction booth 60. The computer system 62 may also be configured to control the access point(s) to open in response to the authentication completed outside of the transaction booth 60, but the computer system 62 may close the access point(s) upon receipt of signals from the monitoring features that indicate that no person is inside the transaction booth 60 and after an elapsed period of time (e.g., following the authentication completed outside the transaction booth 60, such as 30 seconds, 60 seconds, or more). Further, the transaction booth 60 may be designed to block access by more than one individual based on a geometry of the interior of the transaction booth 60. The transaction booth 60 may be built from materials that would prevent unauthorized entry or threat from outside of the structure of the transaction booth 60. The transaction booth 60 may block all or some functionality when the transaction booth 60 is not securely closed, as confirmed via sensors (e.g., proximity sensors, cameras, lock monitors at the access point(s)). In this way, the transaction booth 60 may automatically create a secure, enclosed space for the customer to complete the transactions, which may improve authentication techniques and efficiency of the entire transaction booth system.

In addition to dispensing cash and providing access to account information, the transaction booth 60 may also enable foreign currency exchanges. For example, the transaction booth 60 may enable the customer to insert foreign currency into a cash counter 82. The cash counter 82 may count the foreign currency (e.g., determine a value of the foreign currency), and the value may be displayed on the display 68. The customer may then provide an input of a desired currency (e.g., using the input device 70, which may be the display 68), and an exchange rate and/or fees associated with the transaction may be displayed on the display 68. Upon confirmation of the transaction by the customer, the cash dispenser 76 may then dispense the desired currency.

The transaction booth 60 may enable remote notary services. For example, the customer may bring a document to the transaction booth 60. With the input device 70 (e.g., keyboard, the display 68), the customer may select notary services. The customer may then authenticate themselves in one or more of the ways discussed herein (e.g., biometric authentication). Once authenticated, the computer system 62 may automatically initiate a connection to a remotely located notary (e.g., outside of and away from the transaction booth 60) and may establish a voice and/or video meeting with the customer (e.g., using one or more cameras 84, 86, the display 68, a microphone, and/or a speaker). The customer may then place the document in a location detectable by the one or more cameras 84, 86 so that the documents is viewable by the notary. For example, the transaction booth 60 may include a table or stand that is positioned relative to the cameras 84, 86 to enable the cameras 84, 86, 78 to capture an image of the document as the customer signs the document. In some embodiments, the camera 84 may capture an image of the document, as well as the signing of the document. The camera 86 may also capture an image of the signing of the document, along with a face of the customer as the customer signs the document. However, one of the cameras 84, 86 may capture an image of the document, the signing of the document, and the face of the customer as the customer signs the document. After witnessing the signing of the document by the customer via the video images, the notary may provide an input to activate a printer 88. The customer may then insert the signed document into a slot 90 that feeds the document into the printer 88. The notary may then instruct the printer 88 to electrically print the notary's seal and signature (which together may be referred to as a notary signature) onto the signed document. After printing the notary's seal and signature onto the signed document, the printer 88 may eject the signed document through a slot 92 for retrieval by the customer. In some embodiments, some or all of the video images of the notary session may be stored by the computer system 62 for later retrieval and authentication. In some embodiments, electronic documents and authentication may be employed. For example, an electronic document may be signed via a touchscreen and notarized via a digital authentication technique.

The transaction booth 60 may enable check and/or cash deposit, as well as the retrieval and/or deposit of lockboxes. For example, the transaction booth 60 may include a storage container 96 with a slot or door 98 that enables deposit drop off, mail drop off, document drop off, object drop off, among others. These items may be retrieved and then processed on a normal schedule (e.g., by an employee of the financial institution; during normal business hours). Lockboxes 94 may also be retrieved (e.g., from a storage location, such as a vault, within the financial institution) and dropped off at the transaction booth 60. For example, the customer may desire to access a lockbox stored at the financial institution. In order to retrieve the lockbox, the customer may first complete the authentication process (e.g., at a level that is appropriate for access to the lockbox 94). After authentication, the computer system 62 may control a robot 99 (e.g., mechanical arm) that identifies (e.g., using a customer identifier determined during the authentication process and/or based on other inputs from the customer; via a lookup table that relates the customer identifier to a lockbox identifier stored in the memory device 66), selects, accesses, and retrieves the lockbox 94 from the storage location. The computer system 62 may identify the lockbox 94 for the customer by determining a customer identifier based on information collected during the authentication process, and then by using a lookup table (e.g., stored in the memory device 66) that relates the customer identifier to a lockbox identifier. The lockbox 94 is then delivered to the transaction booth 60 (e.g., via a conveyor system). Once inside the transaction booth 60, the computer system 62 may unlock a door 100 in the transaction booth 60 to provide access to the lockbox 94. The customer may then retrieve the lockbox 94 and deposit and/or remove items from the lockbox 94. Afterward, the lockbox 94 may be inserted through the door 100 by the customer for return to the storage location.

Figure 4:
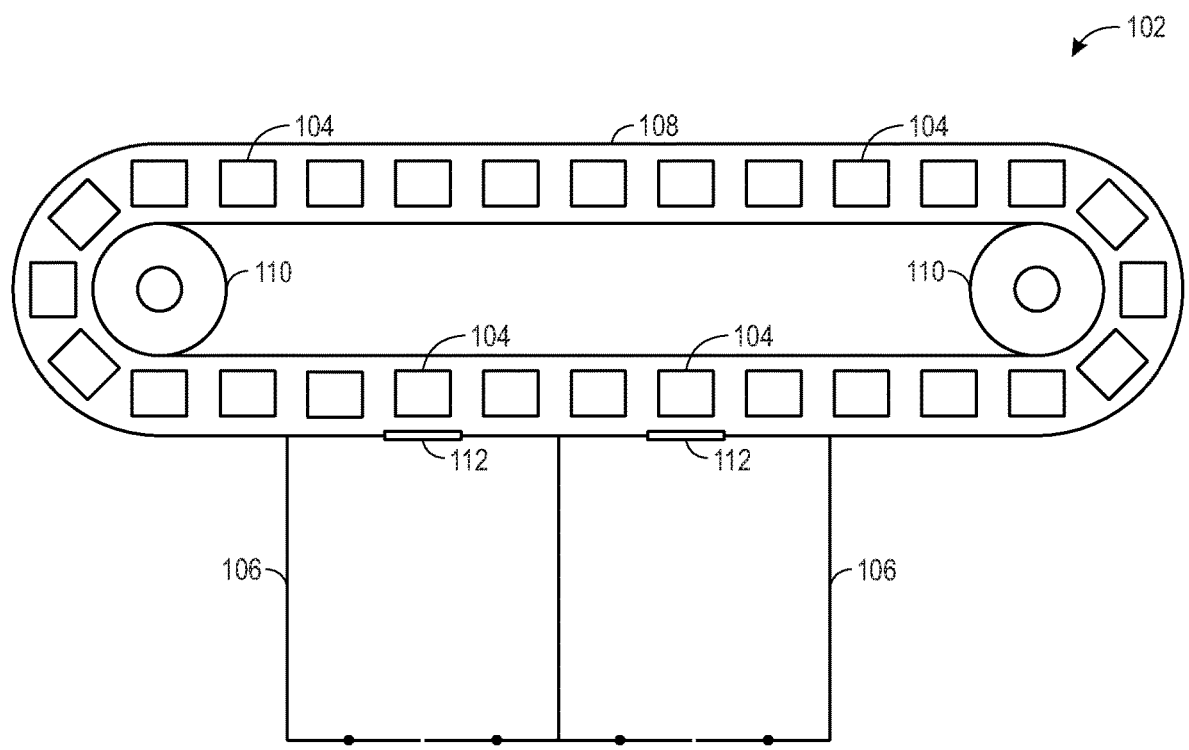
FIG. 4 is a schematic view of a lockbox distribution system, in accordance with embodiments described herein.

FIG. 4 is a schematic view of a lockbox distribution system 102 that is configured to enable rapid retrieval of lockboxes 104 by customers using transaction booths 106. The transaction booths 106 may include any of the features of the transaction booth 11 of FIG. 1, the transaction booths 40 of FIG. 2, and/or the transaction booth 60 of FIG. 3. As illustrated, the lockboxes 104 are supported on a conveyor, which includes one or more conveyor belts 108. For example, the lockboxes 104 may be coupled to the conveyor belt 108 via an interface, such as a key-slot interface that can be actuated to secure one or more of the lockboxes 104 to the conveyor belt 108 and release the lockboxes 104 therefrom. In operation, the conveyor belt 108 may be controlled (e.g., by a computer system, such as the computer system 62 of FIG. 3) to rotate about gears or wheels 110 in order to align particular lockboxes 104 with one or more doors 112 (e.g., within a cavity or cavities covered by the doors 112) in the one or more transaction booths 106. As explained above, the customer may desire to retrieve a lockbox 104 in order to obtain something in the lockbox 104 and/or to store something in the lockbox 104. After proper authentication, the lockbox distribution system 102 is activated to align the lockbox 104 with the door 112 to enable retrieval of the lockbox 104 by the customer. Once the lockbox 104 is aligned with the door 112, the lockbox distribution system 102 stops movement of the conveyor belt 108 and/or actuates a lock to open the door 112. In one embodiment, the lockbox 104 may be transitioned (e.g., via a transitioner, such as a robot arm or translation mechanism) into a receptacle that is readily accessible from within the transaction booth 106 but blocks further access to the lockbox distribution system 102. The customer may then retrieve the lockbox 104. After the customer views, retrieves, and/or adds items to the lockbox 104, the customer may return the lockbox 104 and close the door 112 to block unauthorized access to the lockbox 104. The lockbox distribution system 102 may be controlled by a computer system, such as the computer system 62 of FIG. 3. Furthermore, as noted above, the lockbox distribution system 102 may obtain identification information for the customer during the authentication process and may use the identification information for the customer to identify the lockbox 104 for the customer.

Figure 5:
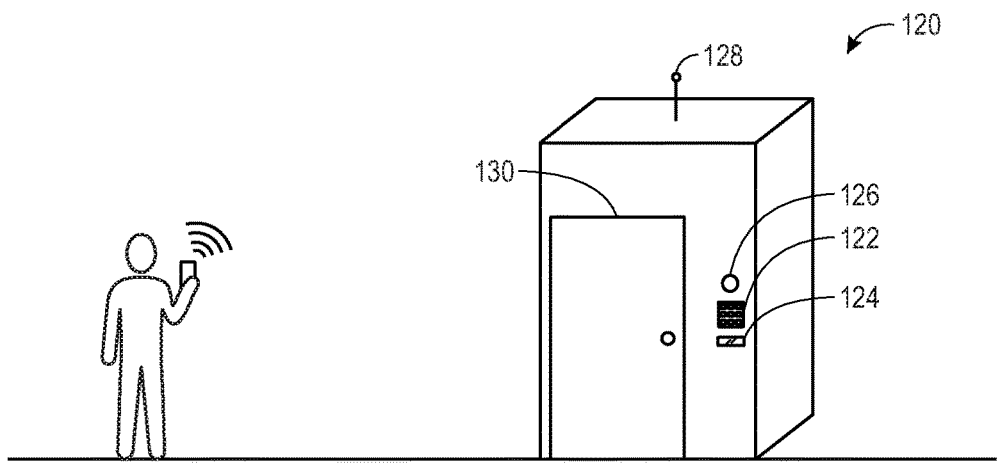
FIG. 5 is a schematic view of a transaction booth that may be located remotely from a financial institution, in accordance with embodiments described herein.

FIG. 5 is a schematic view of a transaction booth 120 that may be located remotely from a financial institution (e.g., not co-located with the financial institution). For example, the transaction booth 120 may be located in residential neighborhoods, shopping malls, supermarkets, office buildings, among others. However, it should be appreciated that the transaction booth 120 may be co-located with the financial institution. The transaction booth 120 may have any of the features of the transaction booth 11 of FIG. 1, the transaction booth 40 of FIG. 2, the transaction booth 60 of FIG. 3, and/or the transaction booth 106 of FIG. 4.

Even if remotely located from the financial institution, the transaction booth 120 may provide some of all of the financial services, including lockbox retrieval and/or storage. Indeed, the financial services provided by the transaction booth 120 may include lockbox retrieval, lockbox storage, notary services, deposits, cash withdrawals, foreign currency exchange, among others. However, instead of immediate retrieval of a lockbox and/or deposit of a lockbox, the customer may request deposit and/or retrieval of a lockbox at a scheduled time (e.g., date and time). For example, the customer may schedule a lockbox transaction at the transaction booth 120 through an application or website (e.g., using a computing device, such as a mobile device, of the customer). A vehicle (e.g., armored truck; van; drone; unmanned aerial vehicle) may drop off the lockbox at the transaction booth 120 prior to the scheduled time (e.g., one day prior; less than one day prior). Then, upon entry of the customer to the transaction booth 120 at the scheduled time, the transaction booth 120 may make the lockbox available to the customer so that the customer may view, retrieve, and/or add items to the lockbox. Upon completion of the transaction with the customer, the transaction booth 120 may initiate communication and/or otherwise provide an indication (e.g., to the financial institution) that the transaction is complete. Additionally or alternatively, the customer may use the application or website to provide an indication (e.g., to the financial institution) that the transaction is complete. Then, the vehicle may pick up the lockbox from the transaction booth 120 to return the lockbox to the financial institution.

It should also be appreciated that the customer may be provided with an alert (e.g., a pop-up notification on the mobile device; electronic mail message) upon receipt of the lockbox at the transaction booth 120 (e.g., automatically in response to receipt of the lockbox at the transaction booth 120). The alert may also include additional available times that the customer may book (e.g., reschedule from the scheduled time) to complete the transaction with the lockbox. For example, the alert may auto-launch an application that prompts the customer to book the time to complete the transaction. This may reduce a total time that the lockbox is present at the transaction booth 120 and/or may improve efficiency of the transaction booth system as a whole. The transaction booth 120 may include sensing components that detect the presence of the lockbox (e.g., read a lockbox identifier, which may be encoded on the lockbox), processing components that determine the additional available times, and/or communication components that communicate with the mobile device to provide the alert, although it should be appreciated that the alert may be provided in other ways by the financial institution.

Other types of transactions may be carried out in a similar manner. For example, the customer may request a currency exchange at the transaction booth 120 at a scheduled time. In some embodiments, the customer may check the availability of the desired currency at the transaction booth 120 (and/or other nearby transaction booths that the customer is interested in visiting). If the desired currency is not available at the transaction booth 120 (and/or at the other nearby transaction booths) in a sufficient amount, the customer may request the currency exchange at the scheduled time. Then, the vehicle may drop off the desired currency at the transaction booth 120 prior to the scheduled time (e.g., one day prior; less than one day prior). Then, upon entry of the customer to the transaction booth 120 at the scheduled time, the customer may complete the currency exchange by physically or electronically depositing the foreign currency in exchange for the desired currency. Upon completion of the transaction with the customer, the transaction booth 120 may initiate communication and/or otherwise provide an indication (e.g., to the financial institution) that the transaction is complete. Additionally or alternatively, the customer may use the application or website to provide an indication (e.g., to the financial institution) that the transaction is complete. It should also be appreciated that the customer may be provided with an alert (e.g., a pop-up notification on the mobile device; electronic mail message) upon receipt of the desired currency at the transaction booth 120. The alert may also include available times that the customer may book (e.g., reschedule from the scheduled time) to complete the transaction. For example, the alert may auto-launch an application that prompts the customer to book the time to complete the transaction. This may improve efficiency of the transaction booth system as a whole. The transaction booth 120 may include sensing components that detect the presence of the desired currency (e.g., read a serial number or other identifier encoded on the desired currency), processing components that determine the additional available times, and/or communication components that communicate with the mobile device to provide the alert, although it should be appreciated that the alert may be provided in other ways by the financial institution. In some embodiments, the transaction booth 120 may reserve or hold the desired currency for the customer (e.g., in an amount requested by the customer) at least until the scheduled time and/or the rescheduled time. However, if the customer is not detected at the transaction booth 120 via the entry authentication system and/or the interior authentication system by the scheduled time and/or the rescheduled time (e.g., or within a time period after the scheduled time and/or the rescheduled time, such as 15, 30, 60, or more minutes of the scheduled time and/or the rescheduled time), the transaction booth 120 may make the desired currency available to other customers.

The transaction booth 120 may be accessible with and/or without authentication. In some embodiments, the transaction booth 120 may be accessed only after authentication. For example, the customer may receive an access code that is then entered on a keypad 122 in order to gain access via an access point 130 (e.g., door(s)). In some embodiments, the transaction booth 120 may include a touch pad 124 for scanning fingerprints and/or a camera 126 (e.g., imaging sensor) capable of capturing retinal images and facial features. In some embodiments, the transaction booth 120 may include a transceiver 128 (e.g., transmitter, receiver, or both) that is configured to detect a physical instrument, such as a key fob, a key card, a driver's license, and/or other identification card (e.g., passport, military identification card). It should be appreciated that a combination of the access code, the biometric identifier, and/or the physical instrument may be used to authenticate the customer and to provide the customer with access to the transaction booth 120.

The transaction booth system disclosed herein includes features that enable efficient authentication (e.g., at varying levels) and access to features of the transaction booth system (e.g., also at corresponding varying levels). The transaction booth system provides for efficient securement of the interior of the transaction booth for the customer. It should be appreciated that any of the features in FIGS. 1-5 may be combined in any suitable manner. While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A transaction booth system, comprising:
 a booth comprising a booth interior configured to receive a customer, wherein the booth is physically coupled to a building;
 a door system comprising a door that is configured to adjust between an open position to open the booth interior and a closed position to enclose the booth interior;
 an entry authentication system configured to authenticate the customer outside of the booth interior;
 an interior authentication system configured to authenticate the customer within the booth interior; and
 a computer system communicatively coupled to the entry authentication system and the interior authentication system, wherein the computer system is configured to:
 control the door of the door system to move to the open position in response to the entry authentication system signaling a confirmed primary authentication and to move to the closed position after detecting the customer within the booth interior;

enable access to one or more financial transactions in response to the interior authentication system signaling a confirmed secondary authentication and based on input from the customer; and block access to other financial transactions based on a level of the confirmed secondary authentication.

2. The transaction booth system of claim 1, comprising a notary service system configured to notarize documents signed by the customer within the booth interior, and wherein the notary service system comprises a printer configured to print a notary signature.

3. The transaction booth system of claim 1, comprising a camera and a display within the booth interior, wherein the camera and the display are configured to facilitate a video conference between a notary and the customer.

4. The transaction booth system of claim 1, comprising a lockbox deposit and retrieval system configured to provide access to a lockbox within the booth interior.

5. The transaction booth system of claim 4, wherein the lockbox deposit and retrieval system comprises a transitioner and a conveyor that are configured to select and deliver the lockbox from a storage location within the building to a cavity accessible from the booth interior.

6. The transaction booth system of claim 1, wherein the computer system is configured to enable access to the one or more financial transactions based on a respective level of the confirmed primary authentication, a respective the level of the confirmed secondary authentication, or both.

7. The transaction booth system of claim 5, wherein the computer system is configured to actuate a lock of a cavity door of the cavity in response to determining that the lockbox is aligned with the cavity door.

8. The transaction booth system of claim 1, comprising one or more sensors configured to detect a presence of an additional one or more customers within the booth interior, and wherein the computer system is configured to block the one or more financial transactions in response to determining the additional one or more customers are within the booth interior.

9. The transaction booth system of claim 1, wherein the computer system is configured to:

prompt the customer to provide a biometric identifier in response to detecting presence of a mobile device of the customer proximate to the booth; and control the door of the door system to move to the open position in response to receipt of the biometric identifier associated with the customer as the confirmed primary authentication.

10. A transaction booth system, comprising:

a booth comprising a booth interior configured to receive a customer, wherein the booth is physically coupled to a building;

a door system comprising a door that is configured to adjust between an open position to open the booth interior and a closed position to enclose the booth interior;

an entry authentication system configured to authenticate the customer outside of the booth interior;

an interior authentication system configured to authenticate the customer within the booth interior;

one or more sensors configured to detect a presence of an additional one or more customers within the booth interior; and a computer system communicatively coupled to the entry authentication system and the interior authentication system, wherein the computer system is configured to:

control the door of the door system to move to the open position in response to the entry authentication system signaling a confirmed primary authentication and to move to the closed position after detecting the customer within the booth interior;

enable access to one or more financial transactions in response to the interior authentication system signaling a confirmed secondary authentication and based on input from the customer; and block the one or more financial transactions in response to determining the additional one or more customers are within the booth interior.

* * * * *